US009761184B2

(12) United States Patent
Kim et al.

(10) Patent No.: US 9,761,184 B2
(45) Date of Patent: Sep. 12, 2017

(54) METHOD OF DRIVING A DISPLAY PANEL, DISPLAY APPARATUS PERFORMING THE SAME, METHOD OF DETERMINING A CORRECTION VALUE APPLIED TO THE SAME, AND METHOD OF CORRECTING GRAYSCALE DATA

(71) Applicant: Samsung Display Co., Ltd., Yongin (KR)

(72) Inventors: Hee-Joon Kim, Yongin-si (KR); Byoung-Seok Yoo, Yongin-si (KR); Jeong-Woon Lee, Cheonan-si (KR); Hoi-Sik Moon, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 165 days.

(21) Appl. No.: 14/173,599

(22) Filed: Feb. 5, 2014

(65) Prior Publication Data

US 2015/0070403 A1 Mar. 12, 2015

(30) Foreign Application Priority Data

Sep. 11, 2013 (KR) ........................ 10-2013-0109186

(51) Int. Cl.
*G06F 1/00* (2006.01)
*G09G 3/36* (2006.01)
(Continued)

(52) U.S. Cl.
CPC ........... *G09G 3/3607* (2013.01); *G09G 3/006* (2013.01); *G09G 3/20* (2013.01); *G09G 3/3611* (2013.01);
(Continued)

(58) Field of Classification Search
CPC ......... G09G 3/3607; G09G 2320/0242; G09G 3/3648; G09G 2320/0673; G09G 2320/0693; G09G 2320/0666; G09G 2320/02; G09G 2320/0233; G09G 2320/0271; G09G 2320/029; G09G 2320/0295; G09G 2320/0285; G09G 3/20; G09G 3/36
(Continued)

(56) References Cited

U.S. PATENT DOCUMENTS 8,059,070 B2 11/2011 Odawara et al.
2009/0135211 A1* 5/2009 Wang ....................... G09G 3/20 345/690

(Continued)

FOREIGN PATENT DOCUMENTS

JP 2001-357394 12/2001
JP 2012-008405 1/2012

(Continued)

*Primary Examiner* — Michael Faragalla
(74) *Attorney, Agent, or Firm* — H.C. Park & Associates, PLC

(57) ABSTRACT

A method of driving a display panel includes generating corrected grayscale data utilizing a grayscale correction value of a reference pixel including m×n pixels, "m" and "n" being natural numbers greater than zero, and driving M×N pixels of the display panel based on the corrected grayscale data, "M" and "N" being natural numbers greater than zero. "M" is greater than "m" and "N" is greater than "n."

12 Claims, 9 Drawing Sheets

(51) Int. Cl.
*G09G 3/00* (2006.01)
*G09G 3/20* (2006.01)

(52) U.S. Cl.
CPC ... *G09G 3/3648* (2013.01); *G09G 2320/0242* (2013.01); *G09G 2330/10* (2013.01)

(58) Field of Classification Search
USPC .......................................................... 345/690
See application file for complete search history.

(56) References Cited

U.S. PATENT DOCUMENTS

| | | | | |
|---|---|---|---|---|
| 2010/0171774 | A1 | 7/2010 | Mizukoshi et al. | |
| 2011/0025587 | A1* | 2/2011 | Chen | G09G 3/36 345/87 |
| 2012/0038954 | A1* | 2/2012 | Wang | H04N 1/3872 358/2.1 |
| 2012/0154459 | A1* | 6/2012 | Otoi | G09G 3/3426 345/690 |
| 2012/0229525 | A1* | 9/2012 | Nakai | G09G 3/3688 345/690 |
| 2013/0010016 | A1* | 1/2013 | Sasaki | G09G 3/20 345/690 |

FOREIGN PATENT DOCUMENTS

| | | |
|---|---|---|
| JP | 2012-141626 | 7/2012 |
| KR | 10-1136286 | 4/2012 |

* cited by examiner

<LUMINANCE REPRESENTATIVE VALUE>

<LUMINANCE TARGET VALUE>

<LUMINANCE CORRECTION VALUE>

METHOD OF DRIVING A DISPLAY PANEL, DISPLAY APPARATUS PERFORMING THE SAME, METHOD OF DETERMINING A CORRECTION VALUE APPLIED TO THE SAME, AND METHOD OF CORRECTING GRAYSCALE DATA

CROSS-REFERENCE TO RELATED APPLICATION

This application claims priority from and the benefit of Korean Patent Application No. 10-2013-0109186, filed on Sep. 11, 2013, which is incorporated by reference for all purposes as if fully set forth herein.

BACKGROUND

Field

Exemplary embodiments relate to a method of driving a display panel, a display apparatus performing the method, a method of determining a correction value applied to the method, and a method of correcting grayscale data. More particularly, exemplary embodiments relate to a method of driving a display panel to compensate for pixel or wide-area pixel defects (also known as Mura defects), a display apparatus performing the method, a method of determining a correction value applied to the method, and a method of correcting grayscale data.

Discussion

Conventional liquid crystal (LC) display panels typically include a lower substrate, an upper substrate opposite the lower substrate, and an LC layer disposed between the lower substrate and the upper substrate. The lower substrate usually includes a pixel area including a plurality of pixels and a peripheral area where one or more components may be disposed to provide driving signals to the plurality of pixels. Data lines, gate lines, and pixel electrodes are usually disposed in the pixel area. The data lines extend in a first direction, the gate lines extend in a second direction crossing the first direction, and the pixel electrodes are connected to at least one of the data lines and at least one of the gate lines. A first driving chip pad and a second driving chip pad are typically disposed in the peripheral area. The first driving chip pad receives data signals and the second driving chip pad receives gate signals.

Typically, a conventional LC display panel may be subjected to one or more quality assurance tests. For instance, after the LC layer is disposed between the lower substrate and the upper substrate, the LC display panel may be tested through a visual test process that tests the electrical and optical operations of the LC display panel. The visual test process may include a tester manually inspecting for various display pattern stains (e.g., irregular variations or Mura defects) and attempting to remove discovered display pattern stains using a stain remover algorithm. Such manual tests are time consuming and may provide inconsistent results across a team of visual inspectors. To this end, the cyclical nature, randomness, and often low contrast presentation of the defects make accurate detection and classification rather difficult. This may reduce productivity, as well as increase the potential for compensation errors.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a method of driving a display panel to compensate for one or more irregular variation (or Mura) defects.

Exemplary embodiments provide a display apparatus configured to perform the driving method.

Exemplary embodiments provide a method of determining a correction value.

Exemplary embodiments provide a method of correcting grayscale data.

Additional aspects will be set forth in the detailed description which follows, and, in part, will be apparent from the disclosure, or may be learned by practice of the inventive concept.

According to exemplary embodiments, a method of driving a display panel includes generating corrected grayscale data utilizing a grayscale correction value of a reference pixel including m×n pixels, "m" and "n" being natural numbers greater than zero, and driving M×N pixels of the display panel based on the corrected grayscale data, "M" and "N" being natural numbers greater than zero. "M" is greater than "m" and "N" is greater than "n."

According to exemplary embodiments, a display apparatus includes a display panel, a storage part, a data correction part, and a data driving part. The display panel includes M×N pixels, "M" and "N" being natural numbers greater than zero. The storage part is configured to store grayscale correction values of a reference pixel respectively corresponding to a plurality of sample grayscales, the reference pixel including m×n pixels, "m" and "n" being natural numbers greater than zero. The data correction part is configured to generate corrected grayscale data utilizing a grayscale correction value of the reference pixel. The data driving part is configured to generate data voltages for the M×N pixels based on the corrected grayscale data. "M" is greater than "m" and "N" is greater than "n."

According to exemplary embodiments, a method of determining a correction value, includes: obtaining a plurality of sample grayscale images; generating a sample unit image utilizing one of the plurality of sample grayscale images, a resolution of the sample unit image being lower than a resolution of the one sample grayscale image; determining a luminance representative value of a reference pixel utilizing the sample unit image; generating a gamma curve of the reference pixel; determining a luminance correction value of the reference pixel utilizing the luminance representative value; and determining a grayscale correction value of the reference pixel corresponding to the luminance correction value utilizing the gamma curve of the reference pixel.

According to exemplary embodiments, a method of correcting grayscale data, includes: obtaining a plurality of sample grayscale images displayed via a display panel; generating a sample unit image utilizing one of the plurality of sample grayscale images, a resolution of the sample unit image being lower than a resolution of the sample grayscale image; determining a luminance representative value of a reference pixel utilizing the sample unit image; generating a gamma curve of the reference pixel; determining a luminance correction value of the reference pixel utilizing the luminance representative value; determining a grayscale correction value of the reference pixel corresponding to the luminance correction value utilizing the gamma curve of the reference pixel; and applying the grayscale correction value of the reference pixel to the grayscale data of a pixel of the display panel to generate corrected grayscale data.

According to exemplary embodiments, Mura defects discovered in at least one of a display panel and a light-source part may be removed by correcting grayscale data so that the display apparatus may display a uniform image.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
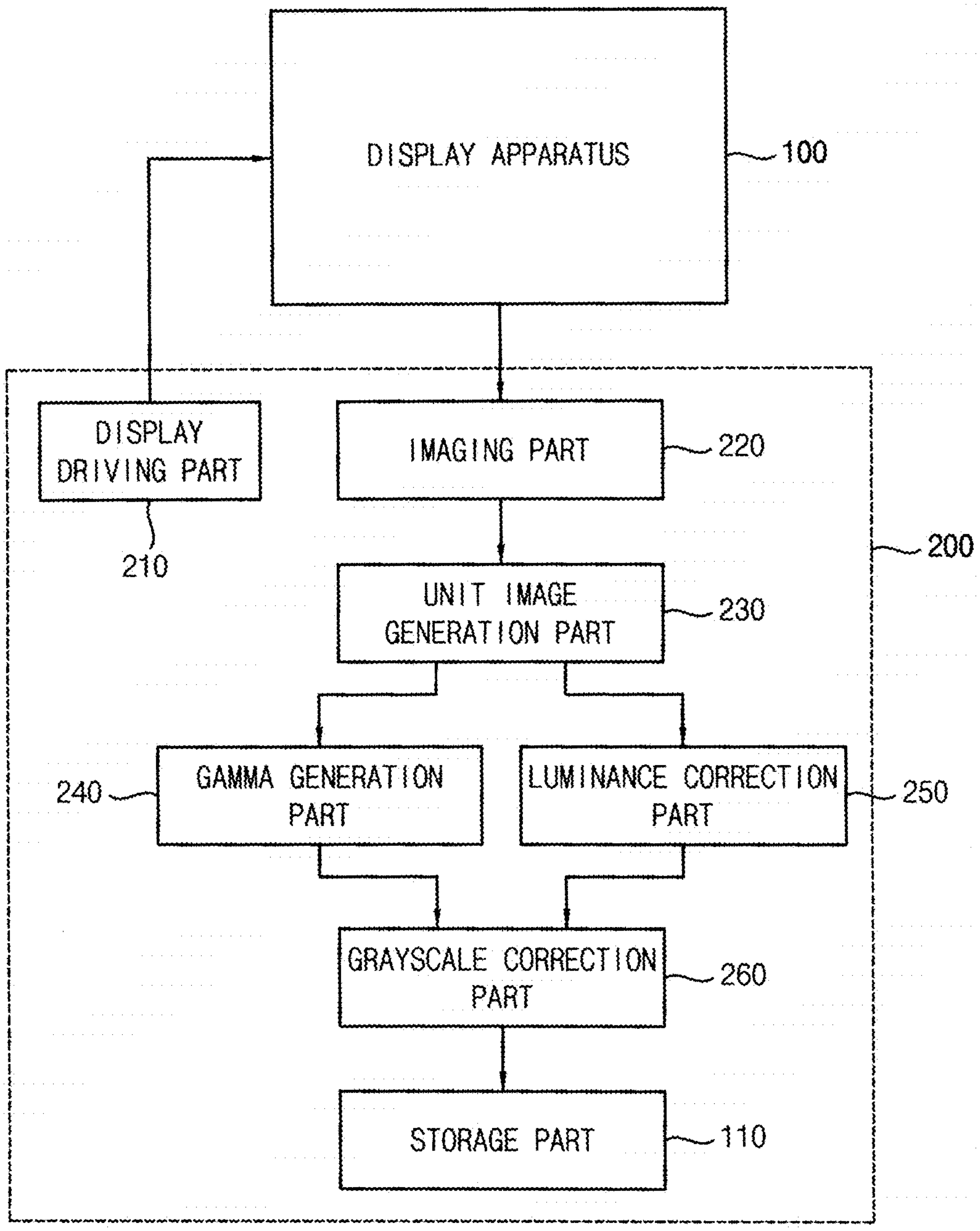
FIG. 1 is a block diagram illustrating a vision inspection system, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram illustrating a vision inspection system, according to exemplary embodiments.

Referring to FIG. 1, a vision inspection system 200 may include a display driving part 210, an imaging part 220, a unit image generation part 230, a gamma generation part 240, a luminance correction part 250, a grayscale correction part 260, and a storage part 110. Although specific reference will be made to this particular implementation, it is also contemplated that the vision inspection system 200 may embody many forms and include multiple and/or alternative components. For example, it is contemplated that the components of the vision inspection system 200 may be combined, located in separate structures, and/or separate locations.

The display driving part 210 may display (e.g., sequentially display) K sample grayscale images via a display apparatus 100. The display apparatus 100 may have at least one Mura defect. It is noted that “K” is a natural number greater than zero. The display apparatus 100 may be a display panel or a display module that includes the display panel and a light-source part. For example, the display apparatus 100 may include an abnormal light-source part having a Mura defect and a display panel that has passed inspection. As another example, the display apparatus 100 may include a light-source part that has passed inspection and an abnormal display panel having a Mura defect. Still further, the display apparatus 100 may include an abnormal light-source part and an abnormal display panel, each of which include a Mura defect. It may also be that the display apparatus 100 includes a light-source part and a display panel that have each passed inspection.

According to exemplary embodiments, the display apparatus 100 may be a flat type, a curved type, or a combination flat, curved type display. The display apparatus 100 may have a resolution of M×N pixels, where “M” and “N” are natural numbers greater than zero. For instance, the display apparatus 100 may be a liquid crystal display, an organic light emitting display, a plasma display, a field emission display, an electrophoretic display, an electrowetting display, etc. In other words, any suitable display apparatus may be utilized in association with exemplary embodiments described herein.

The K sample grayscale images may be set as 10 sample grayscales with respect to a range of 256 grayscales. For example, the 10 sample grayscales may include a 0 grayscale, a 16 grayscale, a 24 grayscale, a 32 grayscale, a 64-grayscale, a 128 grayscale, a 160 grayscale, a 192 grayscale, a 224 grayscale, and a 255 grayscale. It is contemplated that the sample grayscales may be set variably, randomly, according to pattern, etc. It is also contemplated that any suitable range of grayscales may be utilized, as well as any suitable number of sample grayscales within a range of grayscales.

In exemplary embodiments, the imaging part 220 may obtain (or otherwise record or reproduce) the sample grayscale images that are displayed (e.g., sequentially displayed) via the display apparatus 100. The imaging part 220 may be a charge-coupled device (CCD) camera or any other suitable imaging device. Each of the sample grayscale images may include M×N pixels corresponding to the resolution of the display apparatus 100. Each of the pixels may include a plurality of sub-pixels.

The unit image generation part 230 may generate a sample unit image having a resolution of p×q reference pixels utilizing the sample grayscale image having a resolution of M×N pixels. A reference pixel may include m×n pixels of the sample grayscale image. It is noted that “m,” “n,” “p,” and “q” are natural numbers greater than zero. To this end, “m” may be equal to “n.” When “m” is equal to “n,” the reference pixel may have a square shape. It is noted, however, that when “m” is not equal to “n,” the reference pixel may have a rectangular shape. In addition, the reference pixel may be set variously, randomly, according to a pattern, etc. For example, the unit image generation part 230 may generate the sample unit image having a resolution of 480×270 reference pixels utilizing the sample grayscale image having a resolution of 1920×1080 pixels. A reference pixel may include 4×4 pixels of the sample grayscale image. It is contemplated, however, that any suitable arrangement may be utilized.

According to exemplary embodiments, the unit image generation part 230 may determine a luminance representative value of the reference pixel in the sample unit image respectively corresponding to the sample grayscales. The luminance representative value of the reference pixel may be determined as: 1) a luminance value of a determined pixel among the m×n pixels; 2) an average luminance value of the m×n pixels; 3) a maximum luminance value among the m×n pixels; or 4) a minimum luminance value among the m×n pixels. The unit image generation part 230 may determine K×p×q luminance representative values corresponding to the K sample grayscales and the p×q reference pixels.

The gamma generation part 240 may generate a gamma curve respectively corresponding to the p×q reference pixels in the sample unit image. For example, a first gamma curve of a first reference pixel may be generated utilizing luminance representative values of K first reference pixels in K sample unit images. As described above, remaining gamma curves of remaining reference pixels in the sample unit image may be generated. The gamma generation part 240 may generate p×q gamma curves respectively corresponding to the p×q reference pixels.

The luminance correction part 250 may determine a luminance correction value of the reference pixel. For example, the luminance correction part 250 may determine luminance target values of the p×q reference pixels utilizing the luminance representative values of the p×q reference pixels through a multidimensional, e.g., two-dimensioned (2D), fitting algorithm. The fitting algorithm may include a polynomial fitting algorithm, a Gaussian fitting algorithm, etc. It is also noted that the luminance correction part 250 may determine a difference value between the luminance representative value and the luminance target value of the reference pixel, and determine the difference value to the luminance correction value of the reference pixel. The luminance correction part 250 may determine K×p×q luminance correction values corresponding to the K sample grayscales and the p×q reference pixels.

In exemplary embodiments, the grayscale correction part 260 may determine a grayscale correction value of the reference pixel corresponding to the luminance correction value of the reference pixel utilizing the gamma curve. The grayscale correction part 260 may determine K×p×q grayscale correction values corresponding to the K sample grayscales and the p×q reference pixels.

The storage part 110 may store the grayscale correction value of the reference pixel. The storage part 110 may store K×p×q grayscale correction values corresponding to the K sample grayscales and the p×q reference pixels.

In exemplary embodiments, the imaging part 220, the unit image generation part 230, the gamma generation part 240, the luminance correction part 250, the grayscale correction part 260, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof.

To this end, the imaging part 220, the unit image generation part 230, the gamma generation part 240, the luminance correction part 250, the grayscale correction part 260, and/or one or more components thereof may include or otherwise be associated with one or more memories including code (e.g., instructions) configured to cause the imaging part 220, the unit image generation part 230, the gamma generation part 240, the luminance correction part 250, the grayscale correction part 260, and/or one or more components thereof to perform one or more of the features/functions/processes described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Figure 2:
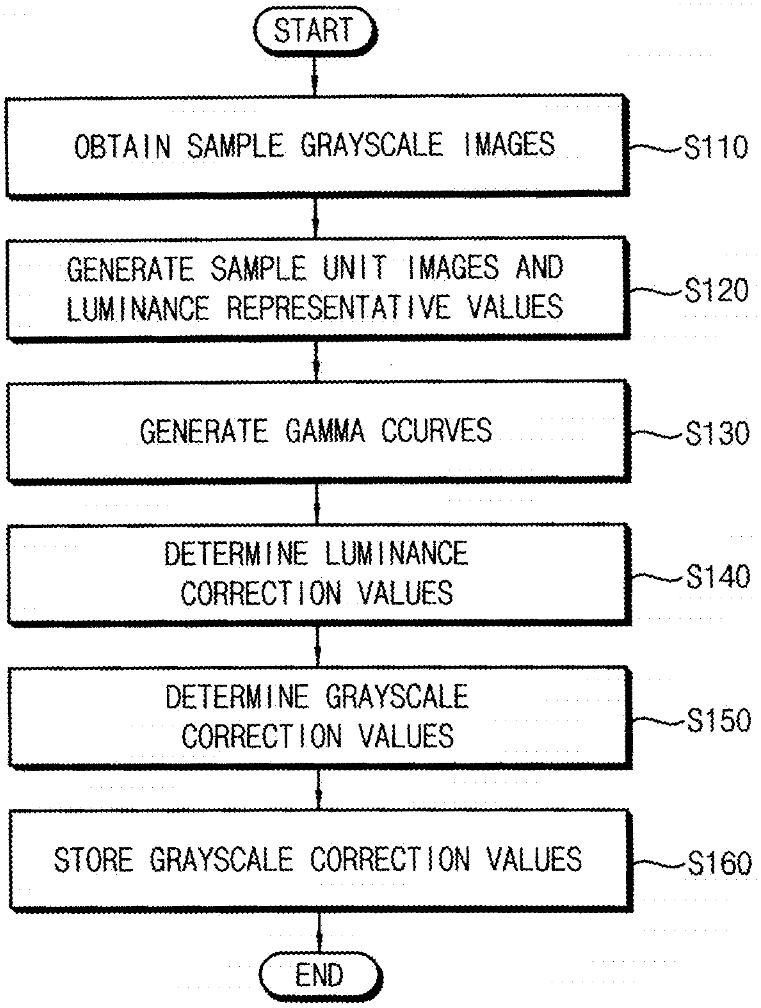
FIG. 2 is a flowchart illustrating a method of determining a grayscale correction value using the vision inspection system of FIG. 1, according to exemplary embodiments.
Figure 3:
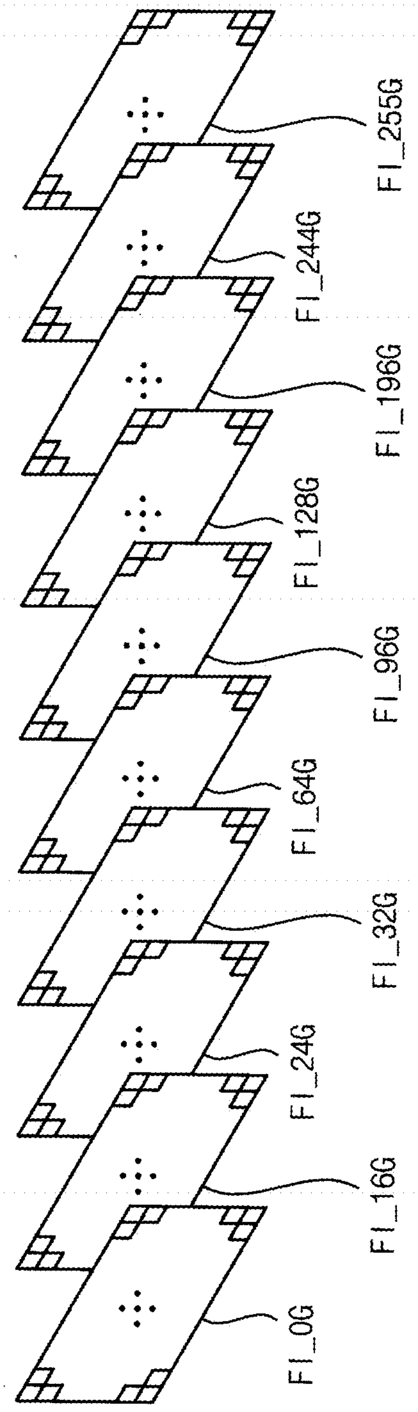
FIG. 3 is a conceptual diagram illustrating an operation of an imaging part of the visual inspection system of FIG. 1, according to exemplary embodiments.
Figure 4:
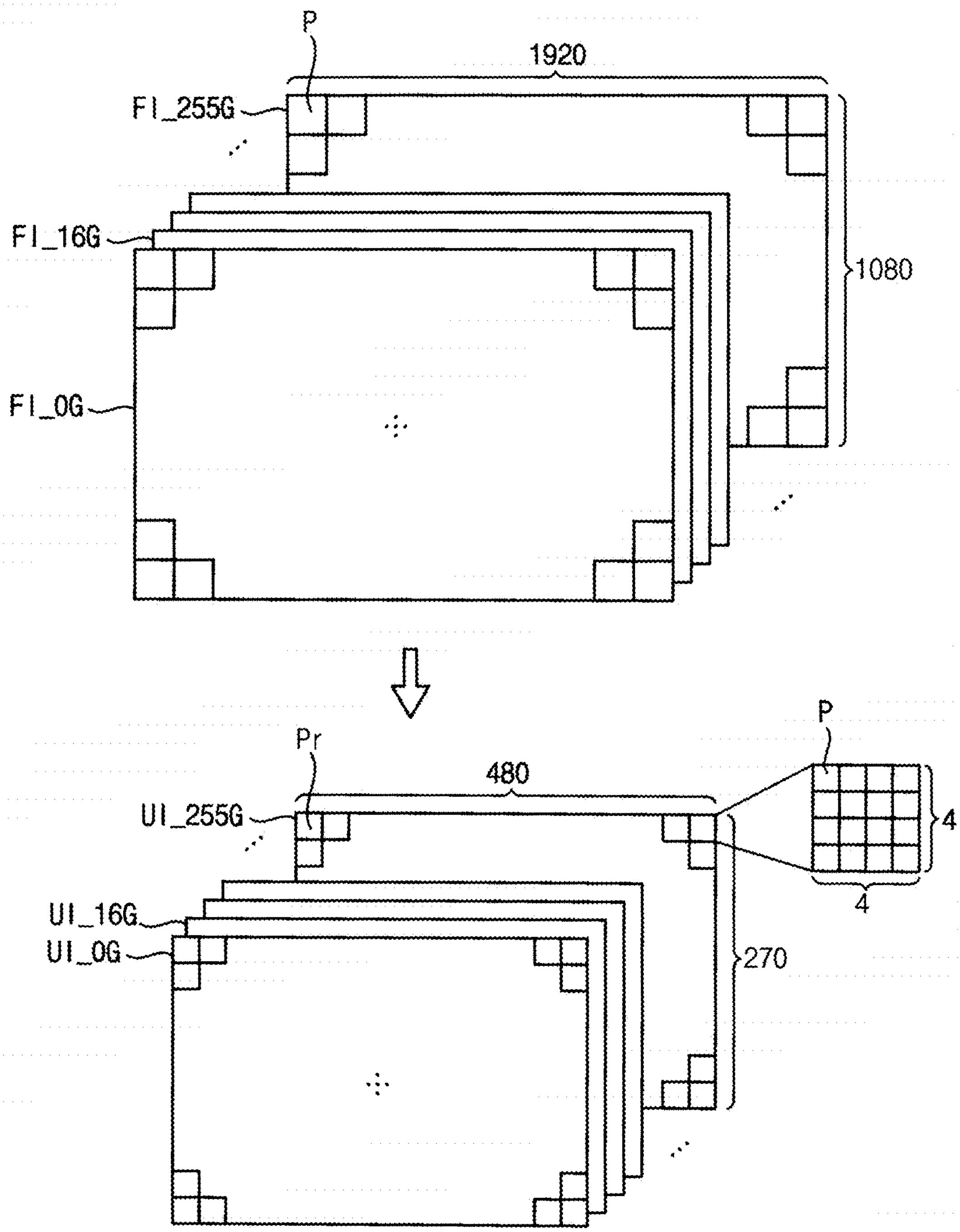
FIG. 4 is a conceptual diagram illustrating an operation of a unit image generation part of the visual inspection system of FIG. 1, according to exemplary embodiments.
Figure 5:
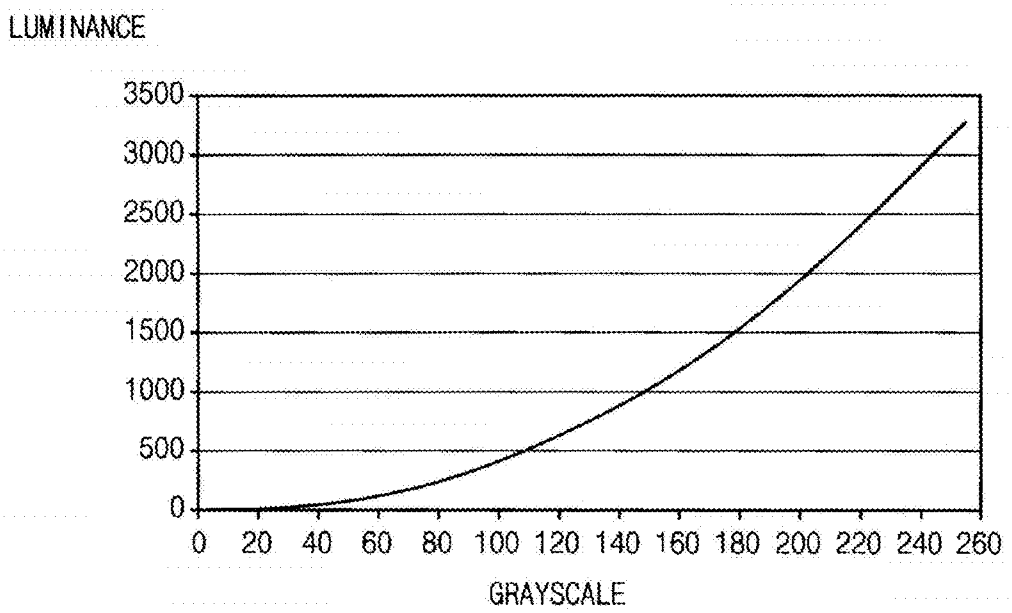
FIG. 5 is a conceptual diagram illustrating an operation of a gamma generation part of the visual inspection system of FIG. 1, according to exemplary embodiments.
Figure 6A:
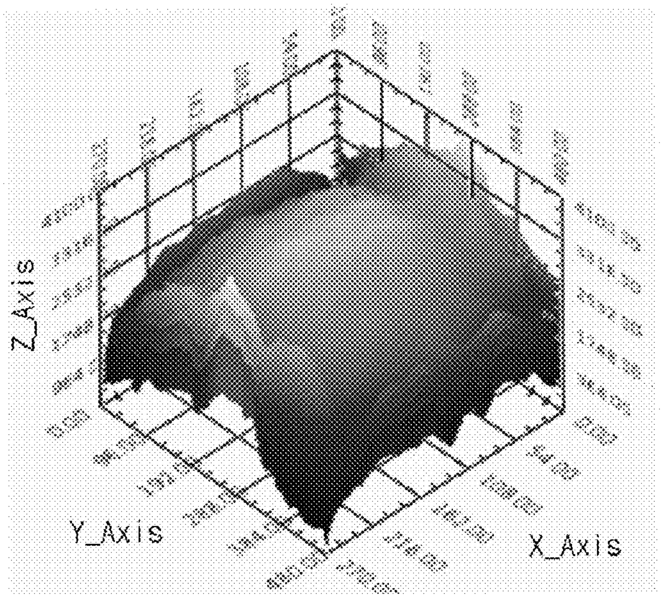
FIGS. 6A to 6C are conceptual diagrams illustrating an operation of a luminance correction part of the visual inspection system of FIG. 1, according to exemplary embodiments.
Figure 6B:
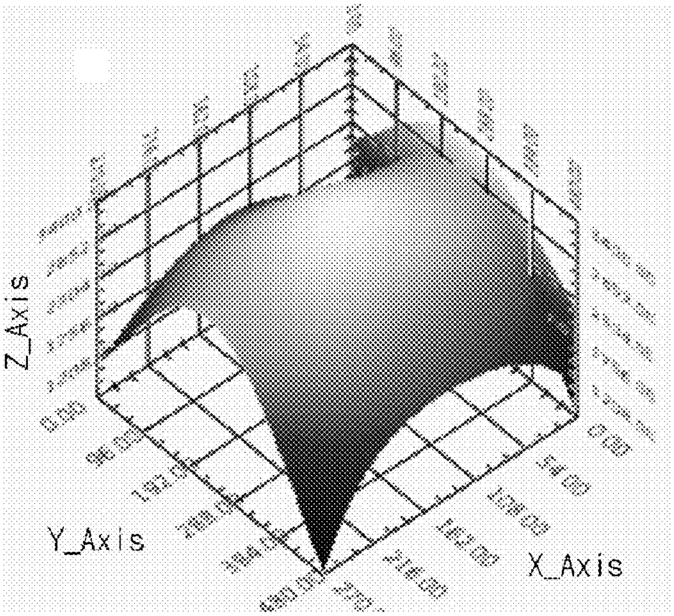
Figure 6C:
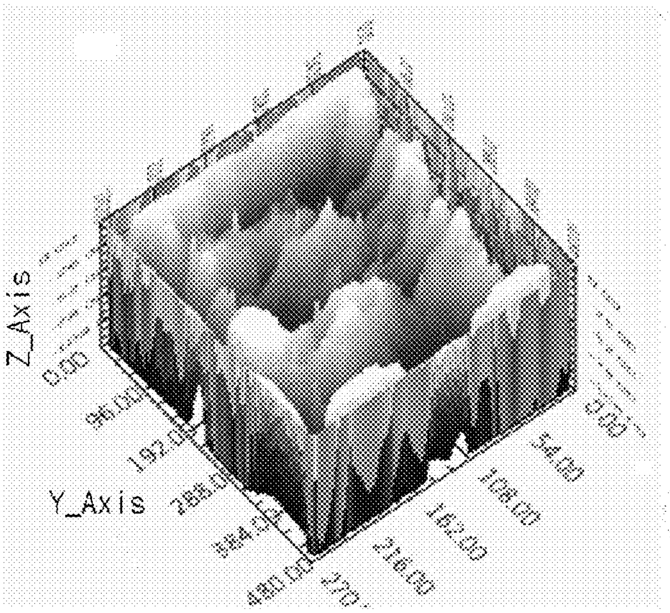

FIG. 2 is a flowchart illustrating a method of determining a grayscale correction value using the visual inspection system of FIG. 1, according to exemplary embodiments. FIG. 3 is a conceptual diagram illustrating an operation of an imaging part of the visual inspection system of FIG. 1, according to exemplary embodiments. FIG. 4 is a conceptual diagram illustrating an operation of a unit image generation part of the visual inspection system of FIG. 1, according to exemplary embodiments. FIG. 5 is a conceptual diagram illustrating an operation of a gamma generation part of the visual inspection system of FIG. 1, according to exemplary embodiments. FIGS. 6A to 6C are conceptual diagrams illustrating an operation of a luminance correction part of the visual inspection system of FIG. 1, according to exemplary embodiments.

Referring to FIGS. 1 through 3, the imaging part 220 may obtain sample grayscale images, such as, for example, 10 sample grayscale images FI, e.g., FLOG, FI_16G, FI_24G, FI_32G, FI_64G, FI_96G, FI_128G, FI_196G, FI_224G, and FI_255G, which may be sequentially displayed via the display apparatus 100 (step S110).

Referring to FIGS. 1, 2, and 4, the unit image generation part 230 may generate a sample unit image UI having a resolution of p×q reference pixels Pr utilizing the sample grayscale images FI having a resolution of the M×N pixels P. For example, the unit image generation part 230 may generate 10 sample unit images UI_0G to UI_255G respectively corresponding to the 10 sample grayscale images FLOG to FI_255G. As previously mentioned, "M," "N," "m," "n," "p," and "q" are natural numbers greater than zero.

The unit image generation part 230 may determine luminance representative values of the reference pixel Pr in the sample unit image respectively corresponding to the sample grayscales. The luminance representative values of the reference pixel Pr may be determined as: 1) a luminance value of a determined pixel among the m×n pixels; 2) an average luminance value of the m×n pixels; 3) a maximum luminance value among the m×n pixels; or 4) a minimum luminance value among the m×n pixels. The unit image generation part 230 may determine 10×480×270 luminance representative values corresponding to 10 sample grayscales 0G to 255G and 480×270 reference pixels Pr (step S120).

Referring to FIGS. 1, 2 and 5, the gamma generation part 240 may generate gamma curves of the reference pixel Pr. For example, a first gamma curve of a first reference pixel Pr may be generated through an interpolation scheme utilizing 10 luminance representative values of 10 first reference pixels Pr in 10 sample unit images corresponding to the 10 sample grayscales 0G to 255G. In this manner, the gamma curves may be "fit" to the sampled data. The gamma generation part 240 may generate 480×270 gamma curves corresponding to the 480×270 reference pixels Pr (step S130). An interval between grayscales of the gamma curve may be variously set to about 8 bits to about 12 bits.

Referring to FIGS. 1, 2, 6A and 6B, the luminance correction part 250 may determine 480×270 luminance target values utilizing 480×270 luminance representative values respectively corresponding to the sample unit images UI_0G to UI_255G through the multidimensional fitting algorithm.

Referring to FIGS. 1, 2 and 6C, the luminance correction part 250 may determine difference values of the reference pixel between the luminance representative values and the luminance target values, as well as determine the difference values to the luminance correction values of the reference pixel. In this manner, the luminance correction part 250 may determine 480×270 difference values utilizing the 480×270 luminance representative values and the 480×270 luminance target values and respectively determine the 480×270 difference values to 480×270 luminance correction values (step S140).

Referring to FIGS. 1, 4 and 6C, the grayscale correction part 260 may determine the grayscale correction values of the reference pixel Pr utilizing the gamma curve of the reference pixel Pr generated from the gamma generation part 240 (step S150).

The storage part 110 may store the grayscale correction values of the reference pixel Pr determined from the grayscale correction part 260 (step S160). In this manner, the storage part 110 may store 480×270 grayscale correction values respectively corresponding to the sample unit images UI_0G to UI_255G.

According to exemplary embodiments, the storage part 110 (including the m×n, e.g., 480×270, grayscale correction values respectively corresponding to the sample unit images UI_0G to UI_255G) may be incorporated in (or otherwise communicatively coupled to) a driving circuit (not shown) of the display apparatus 100. In this manner, the display apparatus 100 may correct grayscale data utilizing the grayscale correction values stored in the storage part 110, generate corrected grayscale data, and display an image utilizing the corrected grayscale data. As such, the display apparatus 100 may display an image compensating for one or more Mura defects, and, thus, improve display quality of the display apparatus 100.

Figure 7:
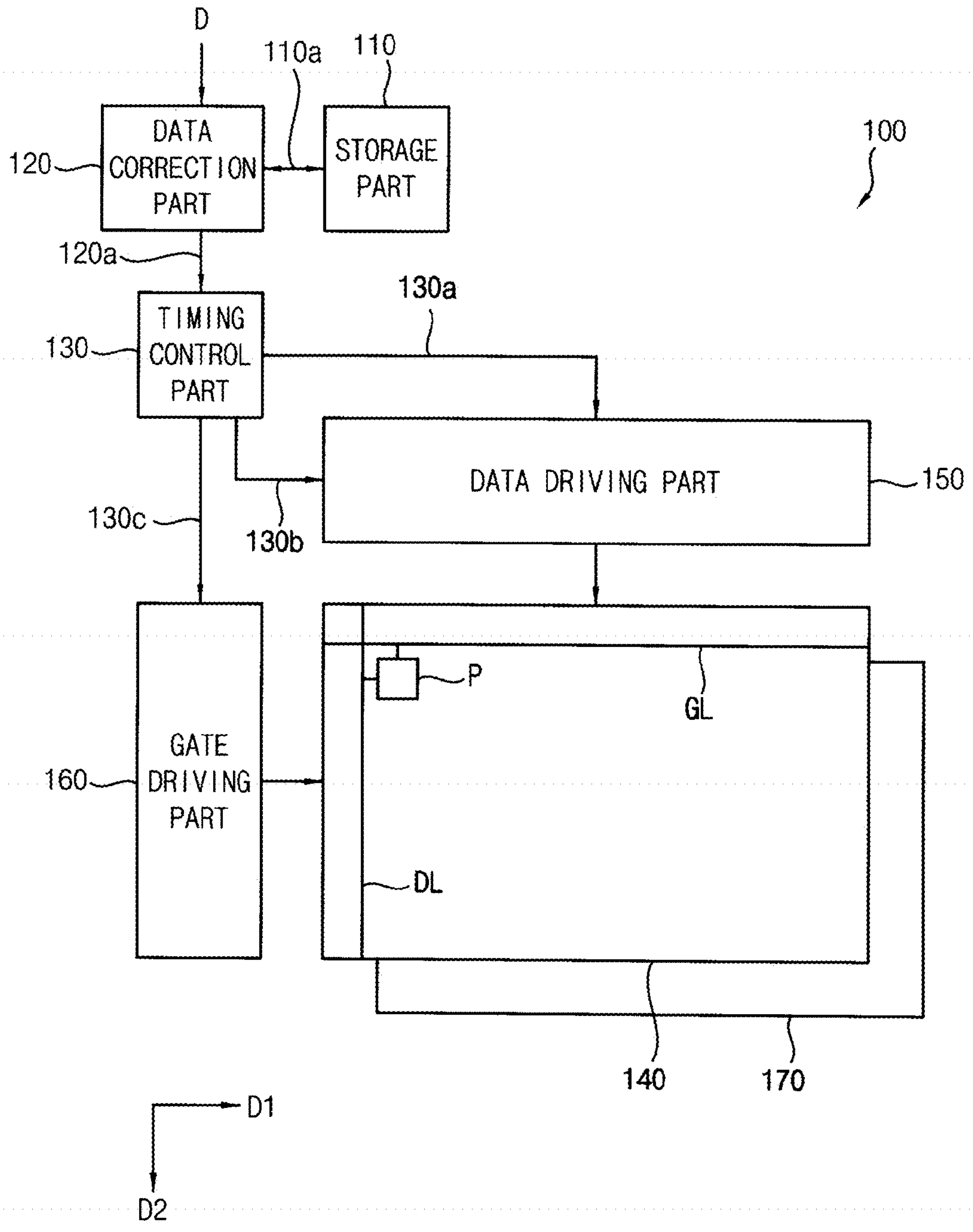
FIG. 7 is a block diagram illustrating a display apparatus, according to exemplary embodiments.

FIG. 7 is a block diagram illustrating a display apparatus, according to exemplary embodiments.

Referring to FIG. 7, the display apparatus 100 may include a storage part 110, a data correction part 120, a timing control part 130, a display panel 140, a data driving part 150, a gate driving part 160, and a light-source part 170.

The storage part 110 may store K×p×q grayscale correction values corresponding to p×q reference pixels of K sample unit images, such as described in association with FIGS. 1 to 5 and 6A to 6C.

The data correction part 120 may correct input grayscale data D utilizing one or more grayscale correction values 110*a* stored in the storage part 110. In this manner, the data correction part 120 may generate corrected grayscale data 120*a*. A method of correcting the grayscale data via the data correction part 120 is described in more detail in association with FIGS. 8A and 8B.

According to exemplary embodiments, the timing control part 130 may drive the data driving part 150 based on the corrected grayscale data 120*a* received from the data correction part 120. For example, the timing control part 130 may adjust the corrected grayscale data through various compensation algorithms to achieve a response time, a white value, etc., and provide the data driving part 150 with the adjusted, corrected grayscale data 130*a*. In addition, the timing control part 130 may generate a data control signal 130*b* to control the data driving part 150 and a gate control signal 130*c* to control the gate driving part 160. In this manner, the timing control part 130 may control the data driving part 150 based on the data control signal 130*b* and control the gate driving part 160 based on the gate control signal 130*c*.

In exemplary embodiments, the display panel 140 may include a plurality of data lines DL, a plurality of gate lines GL and a plurality of pixels P arranged in any suitable formation, e.g., a matrix type formation. The data lines DL may extend in a second direction D2, may be electrically connected to output terminals of the data driving part 150, and may receive data voltages. The gate lines GL may extend in a first direction D1 crossing the second direction D2, may be electrically connected to output terminals of the gate driving part 160, and may sequentially receive gate signals. Each of the pixels P may include a plurality of sub-pixels, e.g., sub-color pixels. It is noted that the display panel 140 may have a Mura defect, which may occur in a manufacturing process.

The data driving part 150 may convert the adjusted, corrected grayscale data 1301 to the data voltages utilizing gamma voltages and may provide the data lines DL of the display panel 140 with the data voltages based on the data control signal 130*b* of the timing control part 130. Further, the gate driving part 160 may generate the gate signals and may provide the gate lines GL of the display panel 140 with the gate signals based on the gate control signal 130*c* of the timing control part 130.

The light-source part 170 may include at least one light-source configured to generate light and to provide at least some of the generated light to the display panel 140. The light-source part 170 may be a direct-illumination type or an edge-illumination type. According to exemplary embodiments, the light-source part 170 may have a Mura defect, which may be deliberately configured in association therewith to decrease the number of light-sources.

Figure 8A:
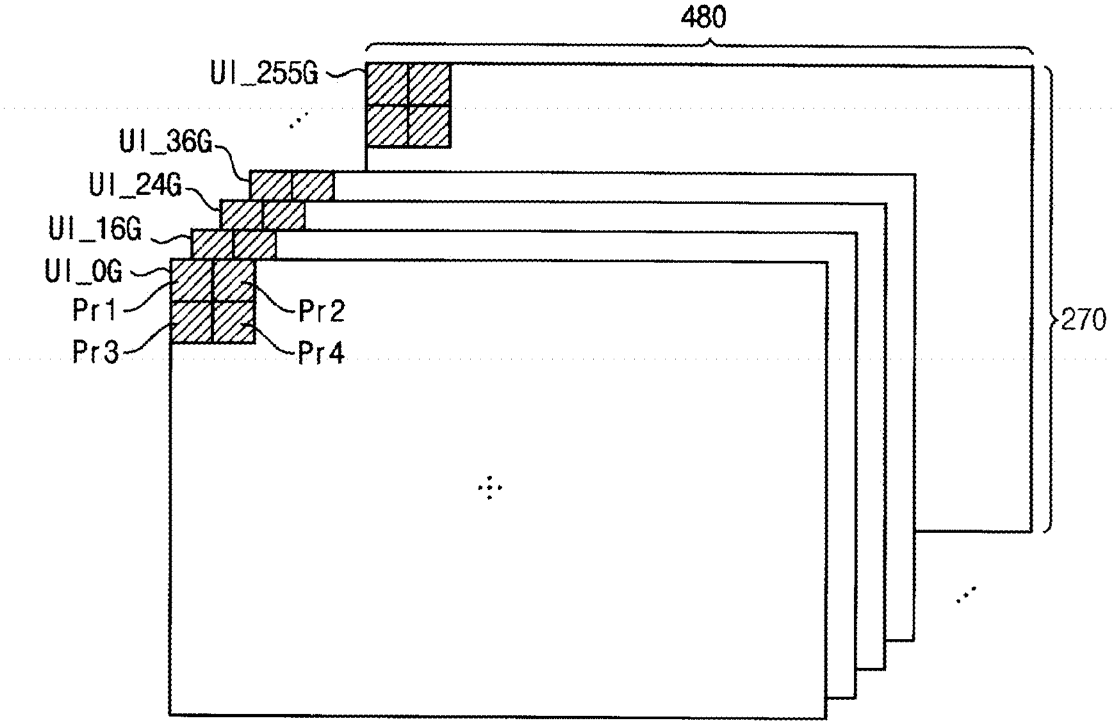
FIGS. 8A and 8B are conceptual diagrams illustrating an operation of a data correction part of the display apparatus of FIG. 7, according to exemplary embodiments.
Figure 8B:
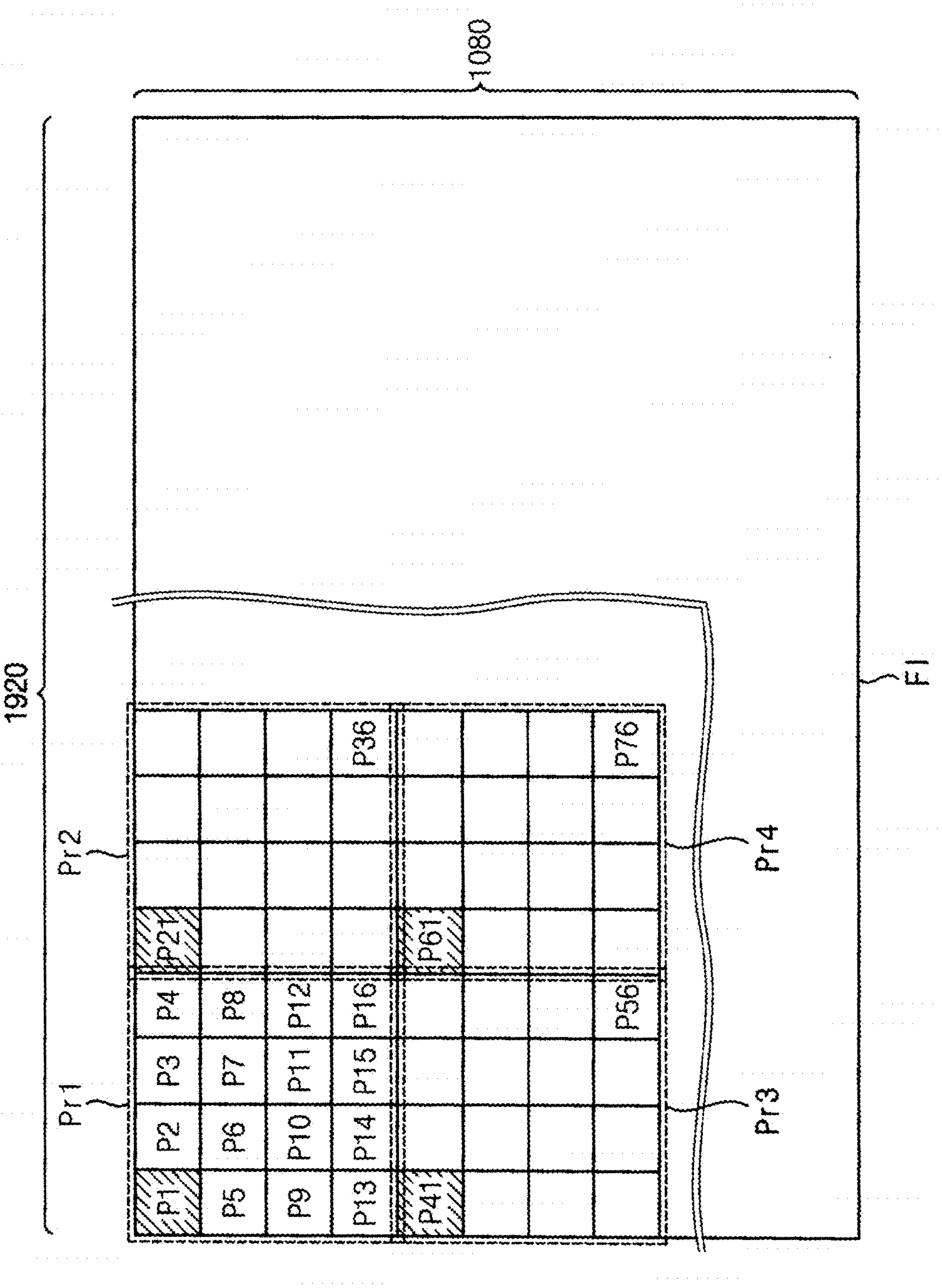

FIGS. 8A and 8B are conceptual diagrams illustrating an operation of a data correction part of the display apparatus of FIG. 7, according to exemplary embodiments.

Referring to FIGS. 7, 8A, and 8B, the storage part 110 may store K×p×q (e.g., 10×480×270) grayscale correction values corresponding to p×q (e.g., 480×270) reference pixels of K (e.g., 10) sample unit images UI, such as UI_0G to UI_255G. Each of the p×q (e.g., 480×270) reference pixels may include n×m (e.g., 4×4) pixels of the sample grayscale images FI. In this manner, a method of correcting the grayscale data may be implemented as described below, which is described in association with an example where M=1920, N=1080, K=10, p=480, q=270, n=4, and m=4.

Referring to FIG. 8A, the storage part 110 may include the grayscale correction values of the 480×270 reference pixels Pr1, Pr2, Pr3, and Pr4 of the sample unit image UL1G of the 0-grayscale, the grayscale correction values of the 480×270 reference pixels Pr1, Pr2, Pr3, and Pr4 of the sample unit image UI_16G of the 16-grayscale, the grayscale correction values of the 480×270 reference pixels Pr1, Pr2, Pr3, and Pr4 of the sample unit image UI_24G of the 24-grayscale, etc. In this manner, the storage part 110 may store the grayscale correction values of the 480×270 reference pixels Pr1, Pr2, Pr3, and Pr4 respectively corresponding to the 10 sample unit images UI_0G to UI_255G.

In exemplary embodiments, the data correction part 120 may receive grayscale data from an image source (e.g., an external image source) having a resolution corresponding to the display panel 140 (e.g., 1920×1080) and may correct the grayscale data utilizing the grayscale correction values stored in the storage part 110.

For example, a frame image FI displayed on the display panel 140 may be divided into a plurality of 4×4 pixels corresponding to the reference pixel Pr of the sample unit image UI. As shown in FIG. 8B, first to 16-th pixels P1 to P16 of the frame image FI may correspond to a first reference pixel Pr1, 21st to 36-th pixels P21 to P36 of the frame image FI may correspond to a second reference pixel Pr2, 41st to 56-th pixels P41 to P56 of the frame image FI may correspond to a third reference pixel Pr3, and 61st to 76-th pixels P61 to P76 of the frame image FI may correspond to a fourth reference pixel Pr4.

The grayscale correction values of the first reference pixel Pr1 may be the grayscale correction values of a first pixel P1 that is a determined pixel among the first to 16-th pixels P1 to P16, the grayscale correction value of the second reference pixel Pr2 may be the grayscale correction value of a 21st pixel P21 that is the determined pixel among the 21st to 36-th pixels P21 to P36, the grayscale correction value of the third reference pixel Pr3 may be the grayscale correction value of a 41st pixel P41 that is the determined pixel among the 41st to 56-th pixels P41 to P56, and the grayscale correction value of the fourth reference pixel Pr4 may be the grayscale correction value of a 61st pixel P61 that is the determined pixel among the 61st to 76-th pixels P61 to P76.

According to exemplary embodiments, the data correction part 120 may obtain the grayscale correction values of the determined pixels among the 4×4 pixels of the reference pixels and the grayscale correction values of the determined pixel among the 4×4 pixels of at least one peripheral reference pixel adjacent to the reference pixel.

For example, when grayscale data of the first pixel P1 corresponding to the first reference pixel Pr1 is equal to at least one of 10 sample grayscales stored in the storage part 110, the data correction part 120 may obtain the grayscale correction value of the first pixel P1 from the storage part 110. When the grayscale data of the 21st, 41st, and 61st pixels P21, P41, and P61 that are the determined pixels of the second, third, and fourth reference pixels Pr2, Pr3, and Pr4 (which are peripheral reference pixels adjacent to the first reference pixel Pr1) are equal to at least one of 10 sample grayscales, the data correction part 120 may obtain the grayscale correction values of the 21st, 41st, and 61st pixels P21, P41, and P61 from the storage part 110.

For example, when the grayscale data of the first pixel P1 is the 16-grayscale data stored in the storage part 110, the data correction part 120 may determine the grayscale correction value of the first reference pixel Pr1 corresponding to the sample unit image UI_16G as the grayscale correction value of the first pixel P1.

When grayscale data of the 21st pixel P21 of the second reference pixel Pr2 (which is a peripheral reference pixel of the first reference pixel Pr1) is the 36-grayscale data stored in the storage part 110, the data correction part 120 may determine the grayscale correction value of the second reference pixel Pr2 corresponding to the sample unit image UI_36G as the grayscale correction value of the 21st pixel P21.

When grayscale data of the 41st pixel P41 of the third reference pixel Pr3 (which is a peripheral reference pixel of the first reference pixel Pr1) is the 24-grayscale data stored in the storage part 110, the data correction part 120 may determine the grayscale correction value of the third reference pixel Pr3 corresponding to the sample unit image UI_24G as the grayscale correction value of the 41st pixel P41.

When grayscale data of the 61st pixel P61 of the fourth reference pixel Pr4 (which is a peripheral reference pixel of the first reference pixel Pr1) is the 64-grayscale data stored in the storage part 110, the data correction part 120 may determine the grayscale correction value of the fourth reference pixel Pr4 corresponding to the sample unit image UI_64G as the grayscale correction value of the 61st pixel P61.

It is noted, however, that when grayscale data of the first pixel P1 corresponding to the first reference pixel Pr1 is not equal to at least one of 10 sample grayscales stored in the storage part 110, the data correction part 120 may obtain the grayscale correction value of the first pixel P1 based on an interpolation scheme utilizing the grayscale correction value of at least one sample grayscale approximate to the grayscale data of the first pixel P1. To this end, when the grayscale data of the 21st, 41st, and 61st pixels P21, P41, and P61 (e.g., the determined pixels of the second, third, and fourth reference pixels Pr2, Pr3, and Pr4), which are peripheral reference pixels adjacent to the first reference pixel Pr1, are not equal to at least one of 10 sample grayscales, the data correction part 120 may obtain each of the grayscale correction values of the 21st, 41st, and 61st pixels P21, P41, and P61 based on an interpolation scheme utilizing the grayscale correction values stored in the storage part 110.

For example, when the grayscale data of the first pixel P1 is the 10-grayscale data not stored in the storage part 110, the data correction part 120 may obtain the grayscale correction values of the first reference pixels Pr1 respectively corresponding to the sample unit images UI_0G and UI_16G, which are approximate to the 10-grayscale data, from the storage part 110. The data correction part 120 may determine the grayscale correction value of the 10 grayscale data based on an interpolation scheme utilizing the obtained grayscale correction values corresponding to the 0-grayscale and the 16-grayscale and utilize the interpolated grayscale correction value of the 10-grayscale data as the grayscale correction value of the first pixel P1.

When grayscale data of the 21st pixel P21 of the second reference pixel Pr2 (which is a peripheral reference pixel of the first reference pixel Pr1) is the 20-grayscale data not stored in the storage part 110, the data correction part 120 may obtain the grayscale correction values of the second reference pixel Pr2 respectively corresponding to the sample unit images UI_16G and UI_24G that are approximate to the 20-grayscale data from the storage part 110. In this manner, the data correction part 120 may determine the grayscale correction value of the 20 grayscale data based on an interpolation scheme utilizing the obtained grayscale correction values corresponding to the 16-grayscale and the 24-grayscale and utilize the interpolated grayscale correction value of the 20-grayscale data as the grayscale correction value of the 21st pixel P21.

When grayscale data of the 41st pixel P41 of the third reference pixel Pr3 (which is a peripheral reference pixel of the first reference pixel Pr1) is the 23-grayscale data not stored in the storage part 110, the data correction part 120 may obtain the grayscale correction values of the third reference pixel Pr3 respectively corresponding to the sample unit images UI_16G and UI_24G that are approximate to the 20-grayscale data from the storage part 110. The data correction part 120 may determine the grayscale correction value of the 23-grayscale data based on an interpolation scheme utilizing the obtained grayscale correction values corresponding to the 16-grayscale and the 24-grayscale and utilize the interpolated grayscale correction value of the 23-grayscale data as the grayscale correction value of the 41st pixel P41.

When grayscale data of the 61st pixel P61 of the fourth reference pixel Pr4 (which is a peripheral reference pixel of the first reference pixel Pr1) is the 30-grayscale data not stored in the storage part 110, the data correction part 120 may obtain the grayscale correction values of the fourth reference pixel Pr4 respectively corresponding to the sample unit images UI_24G and UI_36G that are approximate to the 30-grayscale data from the storage part 110. The data correction part 120 may determine the grayscale correction value of the 30-grayscale data based on an interpolation scheme utilizing the obtained grayscale correction values corresponding to the 24-grayscale and the 36-grayscale and may utilize the interpreted grayscale correction value of the 30-grayscale data as the grayscale correction value of the 61st pixel P61.

When the grayscale correction values of the first, the 21st, the 41st, and the 61st pixels P1, P21, P41, and P61 are obtained, the data correction part 120 may determine the grayscale correction values of the pixels P2 to P16 corresponding to the first reference pixel Pr1 through a linear interpolation scheme between the grayscales and a spatial interpolation scheme between the pixels utilizing the grayscale correction values of the first, the 21st, the 41st, and the 61st pixels P1, P21, P41, and P61.

As described above, the data correction part 120 may determine the grayscale correction values of all of the pixels of the frame image FI. The data correction part 120 may apply the grayscale correction values to the grayscale data and may generate the corrected grayscale data 120*a*. The corrected grayscale data 120*a* may be provided to the timing control part 130, which may adjust the corrected grayscale 120*a* to generate adjusted, corrected grayscale data 130*a*.

According to exemplary embodiments, the data driving part 150 may drive the display panel 140 based on the adjusted, corrected grayscale data 130*a* received from the timing controller 130. As such, the Mura defect may be removed.

According to exemplary embodiments, when a Mura defect is included in at least one of a display panel and a light-source part of a display apparatus, the grayscale data may be corrected to remove the Mura defect, and, thereby, improve display quality. In addition, the number of light-sources of a light-source part may be deliberately decreased; however, a Mura defect that may occur as a result thereof, may be removed through correcting the grayscale data as described above. As such, a cost of the display apparatus may be reduced.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of driving a display panel, the method comprising:

receiving grayscale data to drive the display panel;

retrieving, from a memory, a fixed grayscale correction value of a reference pixel comprising m×n pixels based on the grayscale data, "m" and "n" being natural numbers greater than zero;

determining grayscale correction values for each of the m×n pixels utilizing the fixed grayscale correction value; and correcting the grayscale data by applying the grayscale correction values directly to the grayscale data to generate corrected grayscale data; and driving M×N pixels of the display panel based on the corrected grayscale data, "M" and "N" being natural numbers greater than zero, "M" being greater than "m," and "N" being greater than "n";

retrieving, from the memory, a fixed grayscale correction value of a determined pixel among m×n pixels of at least one peripheral reference pixel adjacent to the reference pixel, wherein:

the fixed grayscale correction value of the reference pixel corresponds to a determined pixel among the m×n pixels of the reference pixel;

the grayscale correction values for each of the m×n pixels in the reference pixel are determined based on an interpolation scheme utilizing the fixed grayscale correction value of the determined pixel of the reference pixel and the fixed grayscale correction value of the determined pixel of the at least one peripheral reference pixel; and "m" is equal to "n".

2. The method of claim 1, wherein the interpolation scheme comprises a linear interpolation scheme between grayscales and a spatial interpolation scheme between pixels.

3. The method of claim 1, wherein the fixed grayscale correction value of the determined pixel of the reference pixel is retrieved from the memory in response to grayscale data of the determined pixel of the reference pixel being equal to a sample grayscale of a plurality of sample grayscales, the memory comprising fixed grayscale correction values of reference pixels stored respectively corresponding to the plurality of sample grayscales.

4. The method of claim 1, wherein:

the fixed grayscale correction value of the determined pixel of the reference pixel is retrieved from the memory in response to grayscale data of the determined pixel of the reference pixel being not equal to a sample grayscale of a plurality of sample grayscales, the memory comprising fixed grayscale correction values of reference pixels stored respectively corresponding to the plurality of sample grayscales; and the grayscale correction value for the determined pixel of the reference pixel is determined based on an interpolation scheme utilizing at least one grayscale correction value of at least one sample grayscale stored in the memory, the at least one grayscale correction value being approximate to the grayscale data of the determined pixel of the reference pixel.

5. A display apparatus, comprising:

a display panel comprising M×N pixels, "M" and "N" being natural numbers greater than zero;

a storage part configured to store grayscale correction values of a reference pixel respectively corresponding to a plurality of sample grayscales, the reference pixel comprising m×n pixels, "m" and "n" being natural numbers greater than zero;

a data correction part configured to:

receive grayscale data;

retrieve, from the storage part, a fixed grayscale correction value of the reference pixel based on the grayscale data;

determine grayscale correction values for each of the m×n pixels utilizing the fixed grayscale correction value;

correct the grayscale data by applying the grayscale correction values directly to the grayscale data to generate corrected grayscale data; and retrieve, from the storage part, a fixed grayscale correction value of a determined pixel among m×n pixels of at least one peripheral reference pixel adjacent to the reference pixel; and a data driving part configured to generate data voltages for the M×N pixels based on the corrected grayscale data, "M" being greater than "m," and "N" being greater than "n,"

wherein:

the fixed grayscale correction value of the reference pixel corresponds to a determined pixel among the m×n pixels of the reference pixel;

determination of the grayscale correction values for each of the m×n pixels in the reference pixel is based on an interpolation scheme utilizing the fixed grayscale correction value of the determined pixel of the reference pixel and the fixed grayscale correction value of the determined pixel of the at least one peripheral reference pixel; and "m" is equal to "n".

6. The display apparatus of claim 5, wherein the interpolation scheme comprises a linear interpolation scheme between grayscales and a spatial interpolation scheme between pixels.

7. The display apparatus of claim 5, wherein the data correction part is configured to retrieve the fixed grayscale correction value of the determined pixel of the reference pixel in response to grayscale data of the determined pixel of the reference pixel being equal to a sample grayscale of the plurality of sample grayscales.

8. The display apparatus of claim 5, wherein the data correction part is configured to:

retrieve the fixed grayscale correction value of the determined pixel of the reference pixel in response to grayscale data of the determined pixel of the reference pixel being not equal to a sample grayscale of the plurality of sample grayscales; and determine the grayscale correction value for the determined pixel of the reference pixel based on an interpolation scheme utilizing at least one grayscale correction value of at least one sample grayscale stored in the storage part, the at least one grayscale correction value being approximate to the grayscale data of the determined pixel of the reference pixel.

9. The display apparatus of claim 5, further comprising:

a light-source part comprising at least one light-source configured to provide the display panel with light.

10. The display apparatus of claim 9, wherein at least one of the display panel and the light-source part comprises a Mura defect.

11. A method of correcting grayscale data, the method comprising:

obtaining a plurality of sample grayscale images displayed via a display panel;

generating a sample unit image utilizing one of the plurality of sample grayscale images, a resolution of the sample unit image being lower than a resolution of the one sample grayscale image;

determining a luminance representative value of a reference pixel utilizing the one sample unit image;

generating a gamma curve of the reference pixel;

determining a luminance correction value of the reference pixel utilizing the luminance representative value;

determining a grayscale correction value of the reference pixel corresponding to the luminance correction value utilizing the gamma curve of the reference pixel;

storing the grayscale correction value of the reference pixel in a memory as fixed data; and applying the grayscale correction value of the reference pixel to the grayscale data of a pixel of the display panel to generate corrected grayscale data, wherein the reference pixel is m×n pixels of the sample grayscale image, "m" and "n" being natural numbers greater than zero, and wherein generating the corrected grayscale data comprises:

obtaining a grayscale correction value of a determined pixel among the m×n pixels of the reference pixel and a grayscale correction value of a determined pixel among m×n pixels of at least one peripheral reference pixel adjacent to the reference pixel;

determining a grayscale correction value of each of the m×n pixels in the reference pixel based on an interpolation scheme utilizing the grayscale correction value of the determined pixel of the reference pixel and the grayscale correction value of the determined pixel of the peripheral reference pixel; and applying the determined grayscale correction values to the grayscale data of the pixel to generate the corrected grayscale data, wherein the luminance representative value of the reference pixel is determined as:

an average luminance value of the m×n pixels;

a maximum luminance value of the m×n pixels;

a minimum luminance value of the m×n pixels; or a luminance value of a determined pixel among the m×n pixels, and wherein "m" is equal to "n".

12. The method of claim 11, wherein:

when grayscale data of the determined pixel of the reference pixel or the peripheral reference pixel is equal to at least one sample grayscale of a plurality of sample grayscales, the grayscale correction value of the determined pixel of the reference pixel or the peripheral reference pixel is obtained from a memory, the memory comprising grayscale correction values of reference pixels stored respectively corresponding to the plurality of sample grayscales; and when the grayscale data of the determined pixel of the reference pixel or the peripheral reference pixel is not equal to at least one sample grayscale of the plurality of sample grayscales, the grayscale correction value of the determined pixel of the reference pixel or the peripheral reference pixel is determined based on an interpolation scheme utilizing at least one grayscale correction value of at least one sample grayscale stored in the memory, the at least one grayscale correction value being approximate to the grayscale data of the determined pixel of the reference pixel or the peripheral reference pixel.

* * * * *